J. W. BUTTERWORTH.
AUTOMATIC ELECTRIC FIRE AND HEAT ALARM.
APPLICATION FILED FEB. 24, 1908.

918,278.

Patented Apr. 13, 1909.

Witnesses:

Inventor
James W. Butterworth
By
James L. Norris

UNITED STATES PATENT OFFICE.

JAMES WILLIAM BUTTERWORTH, OF RICHMOND, NEAR AUCKLAND, NEW ZEALAND.

AUTOMATIC ELECTRIC FIRE AND HEAT ALARM.

No. 918,278.      Specification of Letters Patent.      Patented April 13, 1909.

Application filed February 24, 1908. Serial No. 417,589.

*To all whom it may concern:*

Be it known that I, JAMES WILLIAM BUTTERWORTH, a subject of His Majesty the King of the United Kingdom of Great Britain and Ireland, resident of Stanley street, Richmond, near the city of Auckland, in the Provincial District of Auckland and Dominion of New Zealand, pattern-maker, have invented an Improved Automatic Electric Fire and Heat Alarm, of which the following is a specification.

This invention relates to automatic fire and heat alarms and it provides for the automatic sounding of an electric bell or bells, which are connected by wires to a metal tube, closed at bottom end and containing mercury; one of the wires forming the bell circuit is connected direct on to the metal of the tube, the other wire of the circuit is insulated from the body of the tube, by passing through a plug of suitable insulating material containing an expansion chamber, which is fitted in top of tube the complete circuit being formed when heat causes the mercury contained within the tube to expand and reach a level above its normal, the mercury thereby coming in contact with the end of the wire which is insulated from the metal of the tube, forming a complete circuit for the current of electricity to pass from suitable batteries connected within the circuit, through the mercury causing the electric bell or bells to ring. Suitable means, hereinafter described are used for regulating the device so as to cause it to ring when the surrounding atmosphere reaches any specified or predetermined degree of temperature.

In the accompanying drawing five figures are shown of which—

Figure 1:
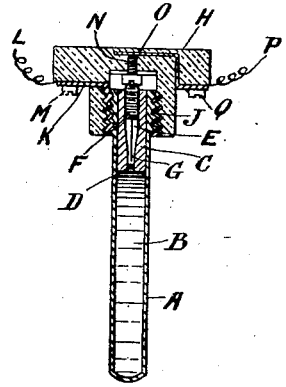
Figure 2:
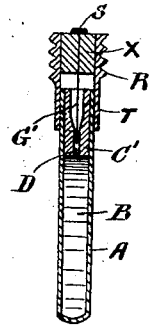
Figure 3:
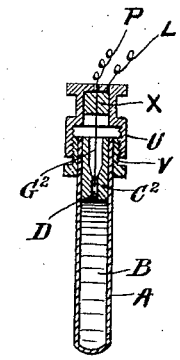
Figure 4:
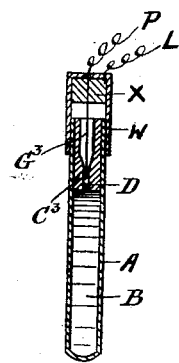
Figure 5:
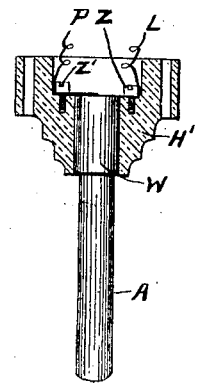

Figure 1 is a sectional elevation of metal tube containing mercury screwed externally and secured thereby within holder to form a contact with bell circuit wires connected thereto, also a screw head regulating device forming the second contact shown within insulating plug at top of tube. Fig. 2 is a sectional elevation of metal tube screwed externally for fitting to a holder similar to that shown in Fig. 1 and showing an alternative form of regulating device. Fig. 3 is a sectional elevation of metal tube for use without holder, and alternative form of regulating device. Fig. 4 is a sectional elevation of metal tube for use without or with a suitable holder to which the projecting wires are attached or connected, and alternative form of regulating device, and Fig. 5 is an elevation of the form shown in Fig. 4, fitted to a holder which is shown in section.

In this device either wire may be the negative but for convenience in description, that wire which is connected directly to the metal tube will be considered hereinunder as the negative wire, and the wire which is insulated from the tube as the positive wire.

The tube A shown in Fig. 1 is closed at the bottom end, and filled with mercury B. An insulating plug C is fitted to the upper end of the tube A, this plug C being bored with a fine hole D which forms an expansion chamber tapering from a rather larger diameter toward wire end G and a larger hole E screwed internally. Within the hole E the screw F is fitted, so that its top end projects somewhat above the top of the insulating plug C; at the lower end of the screw F a wire end G is attached to it, this wire end projecting to within the fine hole D, the distance to which it projects within this hole D being regulated by means of the screw F, the mercury B reaching normally to just within the fine hole D of the plug C.

The holder H is formed of porcelain or other suitable insulating material, and to the lower end of the holder H is fixed the metal cap piece J within which is screwed the top of the metal tube A. A metal strip K is attached to one side of the metal cap piece J, and forms the connection to the negative wire L which is held in contact with the metal strip K by the screw M; it will thus be seen that the negative wire L is thereby in direct contact with the mercury B through the medium of the metal strip K attached to the metal cap piece J, into which tube A screws direct.

A suitable metal screw N is fitted through the holder H, the head of this screw N being in contact with the screw F, the other end of the screw N being connected to the bent metal strip O which is insulated from the negative wire L by the insulating material of the holder H, but is held in contact with the positive wire P by the screw Q and therefore the wire end G of the screw F is in contact with the positive wire P, through the medium of the screw N and the metal strip O, and when the mercury B within the tube A expands, through heat above normal, so that it reaches the wire end G of the screw F, a complete circuit for electric current is formed from the negative wire L to the positive wire P.

In the form shown in Fig. 2, the screw R is formed on the cap T which is separate from the tube A and fits within the metal cap J of the holder H, the wire end G' which fits through an insulating plug X being formed with a suitable metal head S, this metal head S forming contact with the metal screw N of the holder H, when the tube is screwed within the holder. The cap T fits over the tube A, and by sliding this cap T upward or downward upon the tube A, the wire end G can be regulated within the insulating plug C' nearer or farther from the mercury B as desired.

In the form shown in Fig. 3, which is for use without a holder, the body of the tube A is made as in Figs. 1 and 2 but at the top end of the tube A, a fine threaded screw V is formed. An internally screwed metal cap U fits on to this screw V, the positive wire P being fixed in direct contact with the metal cap U. The negative wire L terminates in the wire end $G^2$ within the fine hole $C^2$ of the insulating plug D. Adjustment in this form is obtained by screwing the top V within the metal cap U, thereby drawing the wire end $G^2$ upward or downward within the fine hole $C^2$.

In the form shown in Fig. 4, the body of the tube A is formed as in Fig. 3, but in place of the screw V, the top end of the tube A is left smooth, and the metal cap W which fits over the top end of the tube A is left unthreaded, the positive wire P, and the negative wire L are arranged as in Fig. 3 adjustment of the wire end $G^3$ within the fine hole $C^3$ being made by sliding the metal cap W upward or downward upon the top end of the tube A.

If desired the form shown in Fig. 4 may be fitted to a holder, such arrangement is shown in Fig. 5 in which the adjusting cap W of the tube A is inserted in the holder H', the ends of the negative and positive wires being secured by means of the screws Z and Z', the negative and positive circuit wires L and P being led to and fixed by these screws Z and Z', the body of the holder H' being formed of any suitable insulating material.

In these forms shown in Figs. 2, 3 and 4 insulating plugs X are fitted within the caps R, U and W, so as to insulate the negative wires L from these caps; the caps R, U and W may, after adjustment, be sealed in position by bands of paper, tape, shellac, solder or the like. The tubes may be coated externally with a preparation of black as a better absorbent of heat.

The alarm may be used to detect extra heat in bearing of machinery and such like and in any form of mechanism where extra heat is likely to be generated and also in refrigerating plants. The alarms may be attached to flexible wires for insertion in combustible material or for other purposes.

Though certain forms of holders are described and illustrated herein any form of holder can be used which may be found suitable for the purpose.

In operation, electric current is supplied through the positive wire P, and when a fire occurs, the heat from such will cause the mercury B contained within the tube A to rise within the fine bore or expansion chamber of the insulating plug till it reaches the wire ends G, G', $G^2$ $G^2$, thereby completing the circuit between the positive wire P and the negative wire L through the mercury B, these wires having in circuit electric batteries and bells, the bells will be made to ring when the circuit is complete. It will be seen that the space allowed by adjustment between the wire ends G to $G^3$ and mercury B will regulate the temperature at which the circuit will be completed.

Having now fully described my invention what I desire to claim and secure by Letters Patent is:—

1. A thermostatic device of the class described comprising a tube of electrically conducting material closed at one end, a body of expansible material of electrically conducting properties contained in said tube, a plug closing the other end of said tube and provided with a longitudinal bore tapered in a direction toward the expansible material, a terminal wire arranged in said tapered bore, and means for connecting said tube and wire to the respective terminals of an electric circuit.

2. A thermostatic device of the class described comprising a metal tube closed at one end, a body of mercury contained in said tube, a plug closing the other end of said tube and provided with a longitudinal bore tapered in a direction toward the mercury, a terminal wire arranged within said bore, means for mounting said wire for adjustment axially of said bore, and means for connecting said tube and wire to the respective terminals of an electric circuit.

3. A thermostatic device of the class described comprising a metal tube closed at the bottom, a body of mercury contained in said tube, a plug closing the top of said tube and provided with a longitudinal bore, a terminal wire arranged in said bore, a part supporting said terminal wire and adjustable axially of said tube, and means for electrically connecting said tube and wire to the respective terminals of an electric circuit.

4. A thermostatic device of the class described comprising a metal tube closed at the bottom, a body of mercury contained in the tube, a plug closing the top of said tube and provided with an axial bore tapered in a direction toward the mercury, a terminal wire resting in said bore and adapted to contact with said mercury when expanded, a part having a socket therein to receive the upper end of said tube, and means carried by said socket part for electrically connecting said tube and wire to the respective terminals of an electric circuit when the tube is applied to said socket part.

5. A thermostatic device of the class described comprising a metal tube closed at the bottom, a body of mercury contained in said tube, a plug closing the upper end of the tube and provided with an axial bore, a terminal wire arranged in the bore of said plug and adapted to contact at its lower end with the mercury when expanded, a part adjustable axially of said tube and supporting said terminal wire for axial adjustment in said bore, a holder to receive said part, and means on said holder for electrically connecting said wire and tube to the respective terminals of an electric circuit when the tube is applied to said holder.

JAMES WILLIAM BUTTERWORTH.

Witnesses:
GEORGE WILLIAM BASLEY,
HILDA MAY FROUDE.